Dec. 22, 1959     H. M. McKAY     2,918,301
TRAILER WITH SHIFTABLE REAR TRUCK FOR LOAD EQUALIZING
Filed Oct. 19, 1955     3 Sheets-Sheet 1

INVENTOR
HARRY M. McKAY
BY
ATT

Dec. 22, 1959    H. M. McKAY    2,918,301
TRAILER WITH SHIFTABLE REAR TRUCK FOR LOAD EQUALIZING
Filed Oct. 19, 1955    3 Sheets-Sheet 2
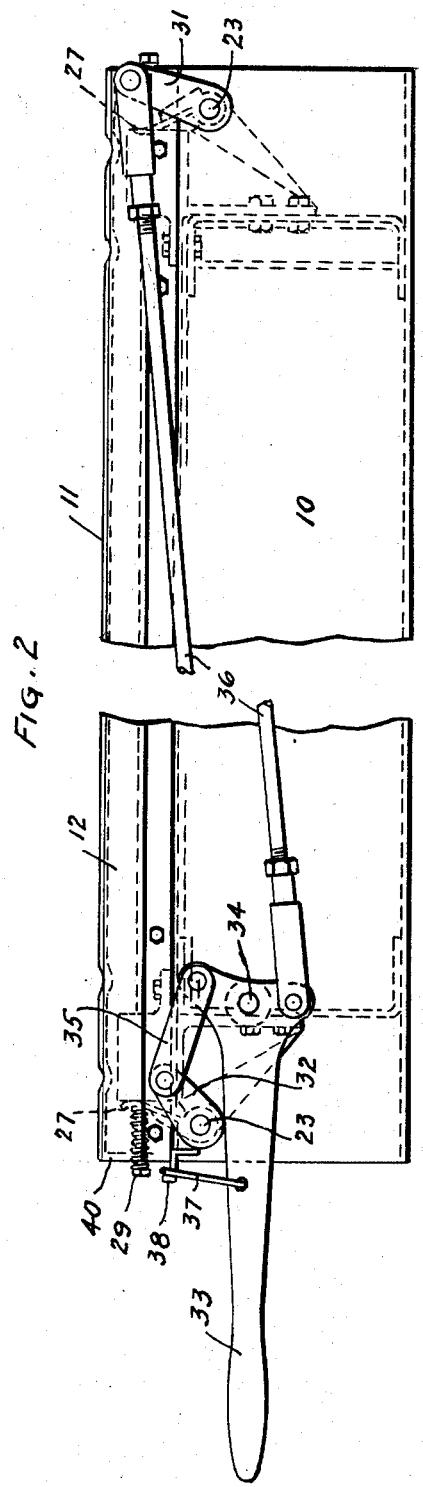
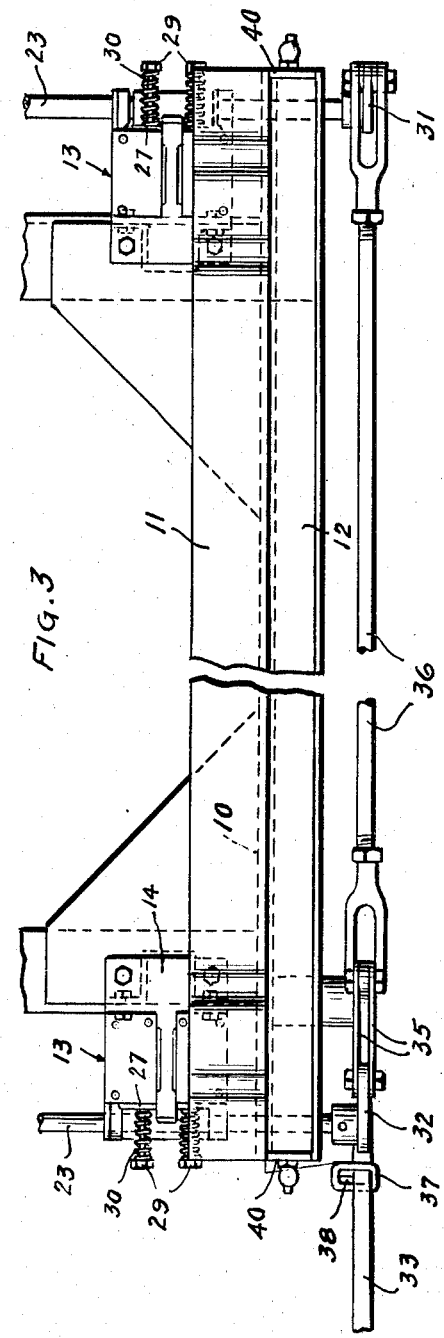
INVENTOR
HARRY M. McKAY
BY John H Cassidy ATT'Y.

Dec. 22, 1959 H. M. McKAY 2,918,301
TRAILER WITH SHIFTABLE REAR TRUCK FOR LOAD EQUALIZING
Filed Oct. 19, 1955 3 Sheets-Sheet 3
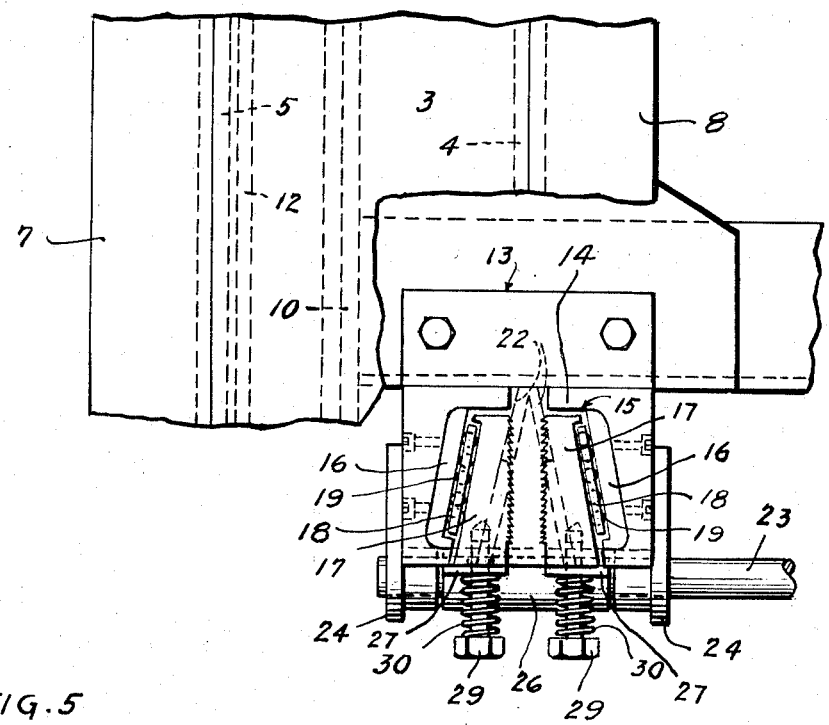
INVENTOR
HARRY M. McKAY
BY [signature] ATT'Y.

United States Patent Office 2,918,301
Patented Dec. 22, 1959

2,918,301

TRAILER WITH SHIFTABLE REAR TRUCK FOR LOAD EQUALIZING

Harry M. McKay, Warrenton, Mo., assignor of one-half to William J. Binkley, Warrenton, Mo.

Application October 19, 1955, Serial No. 541,472

8 Claims. (Cl. 280—81)

This invention pertains to a structure for tractor trailers whereby a load on the wheels may be equalized by adjusting the position of the rear truck longitudinally with respect to the body.

An object of this invention is to provide a simple and easily operated structure whereby the rear truck may be shifted relatively to the body, and securely locked in any adjusted position.

Another object is to provide such a structure in which the wheel truck and the body may be interlocked so as to avoid accidental separation.

Generally stated, the invention provides slide rails on the underside of the chassis of the trailer body, said rails being in the form of channels having their webs at the top and their flanges extending downward. The wheel truck has side sills provided with horizontal top flanges which support said slide rails by engagement with their horizontal webs. The slide rails are each provided with an inturned lip at the bottom of one of its flanges and the wheel truck is provided with a rail interlocking with said lip. Wedging devices are arranged for engagement with the downturned flanges of the slide rails, and manually operated means are provided for engaging and disengaging said wedges to lock the wheel truck in adjusted position.

A preferred embodiment of this invention is illustrated in the accompanying drawings, in which—

Fig. 2 is a side view of a portion of a wheel truck, as shown from the left side of Fig. 1;

Fig. 3 is a top view of Fig. 2;

Fig. 4 is a fragmentary top view of the trailer and truck structure, showing one of the wedging devices;

Fig. 5 is a side view of the wedging device shown in Fig. 4, as seen from the left side of Fig. 4;

Fig. 6 is a face view of one of the wedges, somewhat enlarged; and

Fig. 7 is a left hand side view of Fig. 6.

Figure 1:
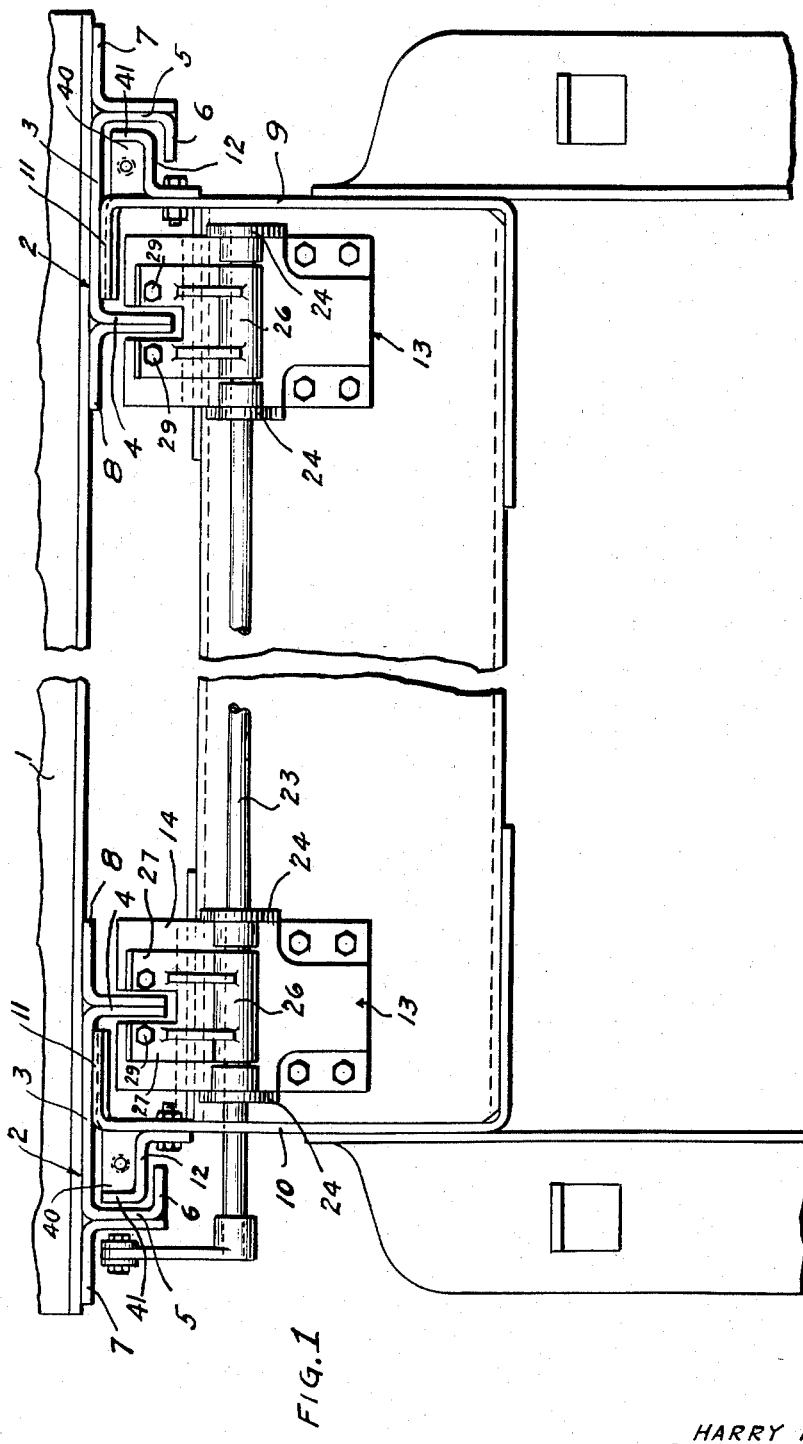
Fig. 1 is a rear view showing the slide rails on the trailer body and portions of the wheel truck supporting the same.

The trailer body of this invention as applied may be of any standard construction. This usually includes suitable side beams joined by cross sills, one of which is indicated at 1, Fig. 1. Secured to the cross sills 1 are slide rails, as shown in Fig. 1. Each of these slide rails comprises a channel member indicated generally at 2, and including a web 3 which is positioned horizontally with its flanges 4 and 5 extending downward therefrom. One of these flanges, such as 5, has its lower edge turned inward to provide a horizontal lip 6. This middle channel may be reenforced by angle members 7 and 8, welded or otherwise secured thereto, as shown in Fig. 1. The rails 2 extend longitudinally of the trailer body, so as to accommodate longitudinal movement of the wheel truck.

The wheel truck comprises side sills 9 and 10. These are of channel form, having their main webs positioned vertically and extending longitudinally with respect to the body. These sills have top flanges 11 which engage the under surfaces of the webs 3 of the slide rails. This is a sliding engagement so that the wheel truck may slide along the rails to adjust the position of the wheels under the body. The flanges 11 are preferably corrugated, as shown in Fig. 1, so as to provide indentations in which grease may be entrapped for lubrication. Each of the sills 9 and 10 has attached thereto, by any suitable means, a Z-bar 12 constituting a guide rail, arranged to extend above the lip 6, as shown in Fig. 1. This provides an interlock between the truck and the body so as to guard against any accidental displacement of one with respect to the other. These Z-bars may extend the full length of the truck, or they may be sectionalized, a shorter section being attached at each end of the sills 9 and 10. In the embodiment shown, each Z-bar includes a vertical outer flange 41, the ends between said vertical flange 41 and sill 9 or 10 being closed by closure plates (Fig. 3) to provide a grease pocket, and grease valves may be mounted in said plates for supplying the grease thereto.

Mounted on the wheel truck are wedging devices, indicated generally at 13. Each of these devices comprises a housing bracket 14, Figs. 4 and 5, formed with a vertically extending cavity 15 having tapered side walls, as shown in Fig. 4. Placed against this side wall are hardened wear plates 16 providing tapered ways. A tapered wedge 17 is mounted opposite to the wear plates 16, as shown in Fig. 4. Between each of the wedges 17 and the adjacent wear plate 16 is mounted a roller cage 18, carrying a series of anti-friction rollers 19, providing for frictionless movement of the wedge along the plate 16. The opposite face of the wedge is provided with teeth 20, adapted to penetrate the flange of the slide rail which extends between the wedges, as will be more particularly pointed out hereinafter.

Each wedge is provided with a key member 21 engageable with an angularly extending slot 22 in the base of the cavity 15. These key members assist in guiding the wedge in its movement into and out of engagement with the flange.

The wedging devices 13 are positioned so that the downturned flange 4 and the adjacent flange of the angle member 8, Fig. 1, which flanges are welded together to form one, extend between the two wedges 17 as supported by the housing 14. There are four of the devices 13, two of which are mounted on the rear of the truck, as shown in Fig. 1, and the other two on the front, one of which is shown in Figs. 2 and 3.

In order to engage and disengage the wedges an operating shaft 23 is journalled in suitable bearing lugs 24 on both of the devices 13 which are mounted on the same end of the truck. That is, a shaft 23 is provided at the rear of the truck, and a similar shaft 23 is provided at the front thereof to control the two front wedging devices. Fixed to the shaft 23 at each of the devices 13 is a lever arm 26, the upper end of which is bifurcated so as to provide arms 27, one of which extends on each side of the flange 4, as shown in Fig. 1. Each of the arms 27 is formed with a short slot 28, Fig. 5, through which a stud 29 is passed and which is screwed into one of the wedges 17, as shown in Figs. 4 and 5.

A compression spring 30 surrounds the stud 29 between its head and the arm 27. It will be seen that by rotating the shaft 23 the lever 26 may be moved so as to move the two wedges 17, attached thereto by the studs 29, either forward or backward, for engagement and disengagement of the wedges with the flange 4.

As may be seen from Fig. 4, movement of the wedges 17 toward the truck (upward in Fig. 4) will cause them to move inward to engage the flange 4. Upon such engagement the teeth 20 may be forced to indent the metal of the flange 4 to provide a secure grip. Once such grip has been attained, any tendency of the flange 4 to move further forward will carry the wedges with it and increase their wedging action so as to restrain such movement. It will be noted that the springs 30 permit such additional movement of the wedges after they have been engaged by the lever 26.

Th wedging devices on both the front and rear of the truck may be operated simultaneously by the device shown in Figs. 2 and 3. The shaft 23 has secured thereto, outside of the sill 10, a crank arm 31. The shaft 23 at the front of the truck has fixed thereto a similar crank arm 32. A manipulating lever 33 is pivoted at 34 on the side of the truck structure. This lever has two arms, one extending upward, as shown in Fig. 2, and connected by a link 35 with the crank arm 32 on the front shaft. The other arm is connected by a long link 36 with the crank arm 31 on the rear shaft 23.

As shown in Fig. 2, the device is in position for engaging the wedges and locking the truck against movement. By rotating the lever 33 downward, in Fig. 2, the linkage just described will rotate the shafts 23 so as to disengage the wedges. Since the springs 30 are short they are compressed tight within a comparatively slight movement of the lever 33, after which the full force exerted by that lever is applied to the wedges to disengage them. The lever 33 may be provided with a link 37, which may be engaged with a hook 38 on the truck structure, so as to hold the lever 33 in locking position.

In the use of this device, when the operator wishes to shift the adjustment of the rear truck he frees the handle 33 by disengaging the link 37, and moves the handle downward so as to disengage the wedges. Such disengagement may be forced, as described above, by forcing the handle 33 downward. If the wedges are stuck too tightly the operator may, after lowering the handle 33, operate the truck engine to move the body forward and back until the wedges are loosened. Thereafter the adjustment of the truck to a new position may be made by moving the body forward or back as required until the new adjustment is attained. Thereafter the wedges are engaged again by moving the handle 33 upward to engage the wedges.

It will be seen that this invention produces a structure whereby the adjustment of the rear wheel truck of a trailer may be done in a simple manner, and the truck securely locked in adjusted position. The operation involves simply unlocking the wedging devices by operation of the handle 33, moving the truck body by operation of the tractor, and then again locking the wedging devices. The grease pocket 12 provides that the adjusting movement may always be smooth and under such conditions accurate adjustments may be made.

Various changes may be made in the details of construction, within the scope of the appended claims, without departing from the spirit of this invention. Parts of the invention may be used without the whole and improvements may be added while retaining some or all of the advantages of the invention.

I claim:

1. In a truck trailer, a body chassis, slide rails on said chassis each including a channel having its web horizontal and flanges extending downward therefrom, a wheel-truck subframe comprising side sills of channel form extending longitudinally of said chassis and having vertical webs and top flanges, said top flanges of said sills slidably supporting said horizontal webs of said rail channels, wedges supported on said subframe engageable with one of said down-turned flanges of said rail channels, manually operable means for engaging and releasing said wedges, and yielding means connecting said wedges to said operating means permitting additional movement of said wedges after engagement.

2. In a truck-trailer, a body chassis, slide rails on said chassis each including a channel having its web horizontal and flanges extending downward therefrom, a wheel-truck subframe comprising side sills of channel form extending longitudinally of said chassis and having vertical webs and top flanges, said top flanges of said sills slidably supporting said horizontal webs of said rail channels, and locking means attached to said subframe including a housing bracket having a middle channel adapted to receive one of said downturned flanges, a wedge on each side of said flange having a toothed face engageable therewith, tapered ways for said wedges on said bracket, roller cages between said wedges and said ways, and means forcing said wedges along said ways, whereby said flange is clamped in said housing bracket.

3. In a truck trailer, slide rails on said chassis each including a channel having a horizontal portion and a flange extending downwardly therefrom, a wheel truck subframe comprising side sills of channel form extending longitudinally of said chassis and having vertical portions and top flanges, said top flanges of said sills slidably supporting said horizontal portions of said slide rails, and locking means attached to said subframe including a housing bracket having a middle channel adapted to receive one of said downturned flanges, a wedge on each side of said flange having an abutment face engageable therewith, tapered ways for said wedges on said bracket, and means attached to said wedges for forcing said wedges along said ways, whereby said flange is clamped in said housing bracket.

4. In a truck trailer, a body chassis having slide rails each including a C-shaped channel member having its broadest web horizontal, flanges extending downwardly therefrom and an inturned lip at the lower edge of one of said flanges, a wheel truck sub-frame comprising side sills of channel form extending longitudinally of said chassis, the top flanges of said sills slidably supporting said horizontal web on said slide rails, and a guide rail on each of said sills extending outwardly therefrom above the inturned lip of said C-channel to interlock therewith, the guide rail having a vertical outer flange engageable with the adjacent flange of said C-channel to guide the movement of the sub-frame therealong.

5. A trailer structure according to claim 4 in which there are closure plates between the ends of said vertical flange and the sill providing a grease pocket between said flange and said sill enclosed by said plates.

6. In a truck trailer, a trailer chassis, slide rails on said chassis, a flange on at least one slide rail extending downwardly therefrom, a wheel truck sub-frame comprising side sills extending longitudinally of said chassis and slidably supporting said slide rails, and locking means attached to said sub-frame including a housing bracket having a middle channel adapted to receive the downturned flange, a wedge on each side of said flange having an abutment face engageable therewith, and operating means attached to said wedges for engaging and releasing said wedges with the opposite sides of said flange.

7. The combination and arrangement of elements as recited above in claim 6, but further characterized by the provision of yielding means connecting said wedges to said operating means and permitting additional movement of said wedges after engagement with said flange.

8. In a truck trailer, a trailer chassis, slide rails on said chassis, a flange on at least one slide rail extending downwardly therefrom, a wheel truck frame comprising side sills extending longitudinally of said chassis and slidably supporting said slide rails, and locking means attached to said sub-frame including a housing bracket having a middle channel adapted to receive said downturned flange, a wedge on each side of said flange having an abutment face engageable therewith, tapered ways for said wedges on said bracket, and means attached to said wedges for forcing said wedges along said ways, whereby said flange is clamped in said housing bracket.

(References on following page)

References Cited in the file of this patent

UNITED STATES PATENTS

| | | |
|---|---|---|
| 700,541 | Murdock | May 20, 1902 |
| 2,277,947 | Bailey | Mar. 31, 1942 |
| 2,332,326 | Lex | Oct. 19, 1943 |
| 2,366,709 | Dean | Jan. 9, 1945 |
| 2,682,419 | Wolf | June 29, 1954 |
| 2,717,663 | Higgins | Sept. 13, 1955 |
| 2,750,207 | Greenway | June 12, 1956 |
| 2,831,735 | Bennett et al. | Apr. 22, 1958 |